US008059541B2

(12) United States Patent
Karagiannis et al.

(10) Patent No.: US 8,059,541 B2
(45) Date of Patent: Nov. 15, 2011

(54) END-HOST BASED NETWORK MANAGEMENT SYSTEM

(75) Inventors: Thomas Karagiannis, Cambridge (GB); Christos Gkantsidis, Cambridge (GB); Peter Key, Cambridge (GB); Elias Athanasopoulos, Heraklion (GR)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 12/125,325

(22) Filed: May 22, 2008

(65) Prior Publication Data

US 2009/0290491 A1    Nov. 26, 2009

(51) Int. Cl.
*G01R 31/08* (2006.01)
(52) U.S. Cl. ...................................................... 370/235
(58) Field of Classification Search .............. 370/203, 370/229–240, 241–253, 298–309, 351–388, 370/395.1, 395.3, 395.4, 395.5, 395.52, 395.53, 370/395.54, 400–411, 412–421, 428–430
See application file for complete search history.

(56) References Cited

U.S. PATENT DOCUMENTS

| | | | | |
|---|---|---|---|---|
| 5,542,047 A * | 7/1996 | Armstrong | ................. | 709/224 |
| 6,502,131 B1 * | 12/2002 | Vaid et al. | ................. | 709/224 |
| 6,529,515 B1 * | 3/2003 | Raz et al. | ................. | 370/401 |
| 6,578,082 B1 * | 6/2003 | Ho et al. | ................. | 709/233 |
| 6,671,724 B1 * | 12/2003 | Pandya et al. | ................. | 709/226 |
| 6,674,717 B1 * | 1/2004 | Duong-van et al. | ......... | 370/230 |
| 6,850,525 B2 * | 2/2005 | Mitsumori et al. | ...... | 370/395.52 |
| 6,931,003 B2 | 8/2005 | Anderson | | |
| 7,023,800 B1 | 4/2006 | McAuley et al. | | |
| 7,142,503 B1 | 11/2006 | Grant et al. | | |
| 7,225,267 B2 | 5/2007 | Key et al. | | |
| 7,593,351 B1 * | 9/2009 | Zioulas et al. | ................. | 370/255 |
| 2002/0176361 A1 | 11/2002 | Wu et al. | | |
| 2003/0081623 A1 | 5/2003 | Kiremidjian et al. | | |
| 2004/0078733 A1 | 4/2004 | Lewis | | |
| 2004/0240451 A1 | 12/2004 | Lee et al. | | |
| 2006/0020686 A1 * | 1/2006 | Liss et al. | ................. | 709/219 |
| 2007/0133405 A1 * | 6/2007 | Bowra et al. | ................. | 370/230 |
| 2007/0198680 A1 * | 8/2007 | Krishnaswamy | ......... | 709/223 |
| 2007/0211627 A1 * | 9/2007 | Pike et al. | ................. | 370/230 |
| 2007/0223377 A1 * | 9/2007 | de Heer | | |
| 2007/0226775 A1 | 9/2007 | Andreasen et al. | | |

(Continued)

OTHER PUBLICATIONS

Anderson, et al., "PCP: Efficient Endpoint Congestion Control", <<http://www.cs.washington.edu/homes/arvind/papers/pcp.pdf>>, pp. 14.

(Continued)

*Primary Examiner* — Kwang B Yao
*Assistant Examiner* — Jung-Jen Liu
(74) *Attorney, Agent, or Firm* — Lee & Hayes, PLLC

(57) ABSTRACT

An end-host based network management system and methods are described. The methods are performed independently at each end-host within the network based on data on local flows which is shared between end-hosts. In an embodiment, an end-host shares data on constrained local flows with other end-hosts and receives such data from other end-hosts. Based on this data, the end-host determines which flows from other nodes are competing for a shared resource with a constrained local flow and allocates the capacity of the shared resource between all the competing flows. This allocation is then enforced for the local flow by the end-host. Other end-hosts with competing flows perform similar methods and through an iterative process the contention for the shared resource is resolved and the utilization of the shared resource is optimized.

16 Claims, 14 Drawing Sheets

U.S. PATENT DOCUMENTS

| | | | |
|---|---|---|---|
| 2008/0021994 | A1* | 1/2008 | Grelewicz |
| 2008/0049615 | A1 | 2/2008 | Bugenhagen |
| 2010/0188986 | A1* | 7/2010 | Csaszar et al. |

OTHER PUBLICATIONS

Ballakrishnan, et al., "An Integrated Congestion Management Architecture for Internet Hosts", ACM, 1999, pp. 175-187.

Barham, "Explicit Congestion Avoidance: Cooperative Mechanisms for Reducing Latency and Proportionally Sharing Bandwidth", ftp://ftp.research.microsoft.com/pub/tr/tr-2001-100.doc>>, pp. 15.

Bhandarkar, et al., "Emulating AQM from End hosts", ACM, 2007, pp. 12.

Broido, et al., "Radon Spectroscopy of Inter-Packet Delay", <<http://www.samsi.info/200304/int/it-5min/broido-it5.pdf>>, pp. 24.

Casado, et al., "Ethane: Taking Control of the Enterprise", ACM, 2007, pp. 12.

Cho, et al.,"Adaptive TCP for Effective and Fair Utilization of High Bandwidth-Delay Product Networks", 2005, pp. 1-27.

Dischinger, et al., "Characterizing Residential Broadband Networks", ACM, 2007, pp. 14.

Gartner, "Worldwide Consumer Broadband Penetration Sees Rapid Growth but Current Price Strategy Alone is Not Sustainable for Telecom Carriers", <<http://www.gartner.com/it/page.jsp?id=501276.>>, pp. 1-3.

Gibbens, "Resource Pricing and the Evolution of Congestion Control", Statistical Laboratory, University of Cambridge, pp. 10.

Karagiannis, et al.,"Profiling the End Host", Springer, 2007, pp. 186-196.

Kelly, et al., "Rate Control in Communication Networks: Shadow Prices, Proportional Fairness and Stability", pp. 16, <<http://www.statslab.cam.ac.uk/~frank/rate.pdf>>.

Kim, et al., "A Wavelet Based Approach to Detect Shared Congestion", ACM, 2004, pp. 13.

Kunniyur, et al., "Analysis and Design of an Adaptive Virtual Queue (AVQ) Algorithm for Active Queue Management", ACM, 2001, pp. 123-134.

Lakshminarayanan. et al., "Bandwidth Estimation in Broadband Access Networks", ACM, 2004, pp. 8.

Lei., et al.,"DMMP: Dynamic Mesh-Based Overlay Multicast Protocol", The IETF Trust , 2008, pp. 30.

Liu, et al., "A Fuzzy Advance Reservation Mechanism of Network Bandwidth in Video Grid", Springer, 2006, pp. 707-715.

Mathis, et al., "TCP Extended Statistics MIB.", TCP Extended Statistics MIB, 2007, pp. 1-71.

Papagiannaki, et al., "Experimental Characterization of Home Wireless Networks and Design Implications", http://www.pittsburgh.intel-research.net/~kpapagia/papers/homenet.pd.

Raghavan, et al., "Cloud Control with Distributed Rate Limiting", ACM, 2007, pp. 12.

Rubenstein, et al., "Detecting Shared Congestion of Flows Via End-to-End Measurement.", ACM SIGMETRICS, 2000, pp. 11.

Simpson, et al., "NETI@home:A Distributed Approach to Collecting End-to-End Network Performance Measurements", http://www.pam2004.org/papers/127.pdf>>, pp. 7.

Yan, et al., "Tesseract: A 4D Network Control Plane", <<http://www.cs.cmu.edu/~4D/papers/tesseract-nsdi07.pdf>>, pp. 14.

Liu, Alpcan, Bauckhage, "Adaptive Wireless Services for Augmented Environments", retrieved on Mar. 22, 2010 at <<www.tansu.alpcan.org/papers/Liu_Alpcan_Bauckhage-Mobiquitous09.pdf>> IEEE Conference on Mobile and Ubiquitous Systems: Networking and Services (MobiQuitous), Jul. 2009, pp. 1-8.

\* cited by examiner

1100

END-HOST BASED NETWORK MANAGEMENT SYSTEM

BACKGROUND

The number of home networks is increasing. These networks typically comprise a collection of different types of devices, such as desktop and laptop computers, games consoles, home servers, media centers, smartphones and IP (internet protocol) telephones. These devices may be used for a wide range of different activities and in some situations the different activities may compete for access to resources within the home network.

Larger networks within corporations or other organizations have policies to control access to resources and a network administrator to set policies and monitor and control the use of the network. Such networks also comprise network elements which perform automatic traffic management. The same cannot be said for home networks or small enterprise networks.

The embodiments described below are not limited to implementations which solve any or all of the disadvantages of known network management systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An end-host based network management system and methods are described. The methods are performed independently at each end-host within the network based on data on local flows which is shared between end-hosts. In an embodiment, an end-host shares data on constrained local flows with other end-hosts and receives such data from other end-hosts. Based on this data, the end-host determines which flows from other nodes are competing for a shared resource with a constrained local flow and allocates the capacity of the shared resource between all the competing flows. This allocation is then enforced for the local flow by the end-host. Other end-hosts with competing flows perform similar methods and through an iterative process the contention for the shared resource is resolved and the utilization of the shared resource is optimized.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
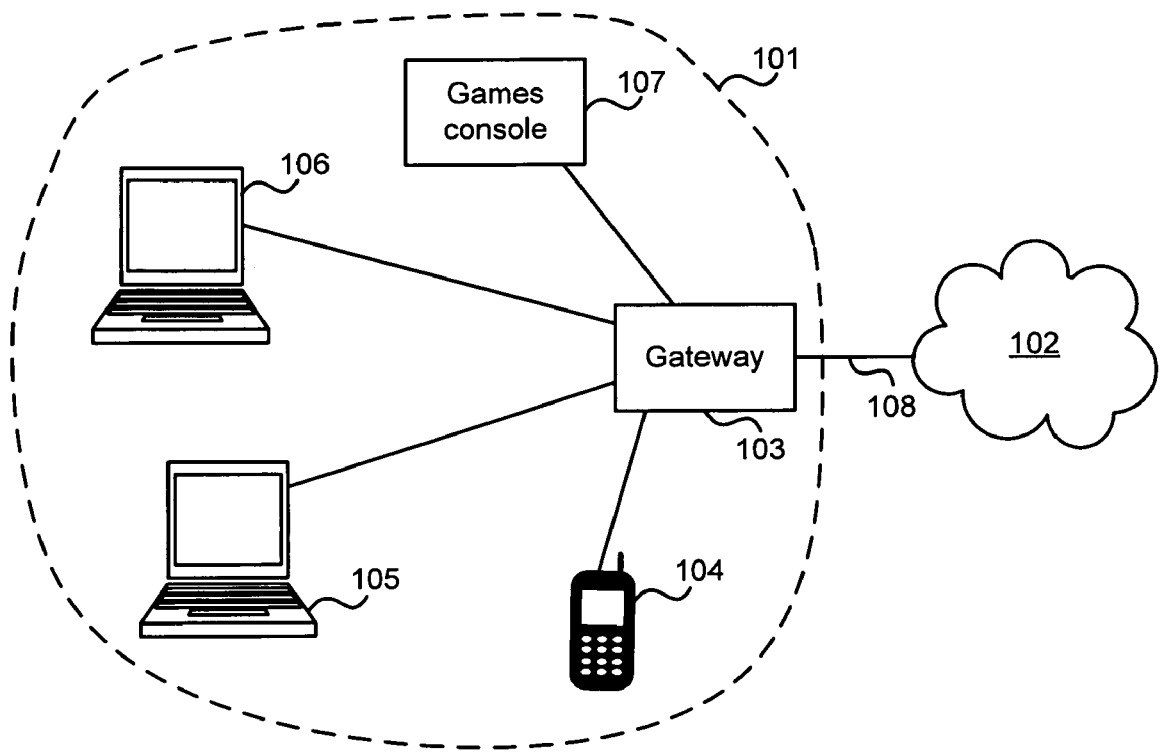
FIG. 1 is a schematic diagram of a home network.

FIG. 1 is a schematic diagram of a home network 101 which is connected to a wider network 102, such as the internet, via a gateway 103. The gateway 103 may comprise a modem (e.g. a DSL or cable modem), a router or other device. The home network 101 comprises a plurality of devices 104-107, which may be heterogeneous devices, such as laptop computers 105, 106, a smartphone 104 and a games console 107. Other examples of devices include network attached storage elements (not shown in FIG. 1). The devices 104-107 may use wired or wireless connections to connect to the gateway and thereby have access to other resources within the home network or external to the home network (i.e. over the wider network 102). Each of these devices 104-107 are referred to herein as end-nodes, end-hosts or hosts. Whilst the network shows only four end-hosts, the network may comprise more end-hosts (e.g. tens of end-hosts) or fewer nodes (e.g. two end-hosts).

Within such a network there may be a number of different shared resources, such as the link 108 (referred to herein as the access link) to the wider network, the capacity of any wireless access point (not shown in FIG. 1), a link to network attached storage (not shown in FIG. 1), etc. In an example, these shared resources may comprise resources which consume network capacity. Further examples of shared resources include set-top boxes (for video and audio streaming to a TV and/or other devices) and security cameras (that upload video to a network storage device). For the purposes of the following description only, the shared resource considered is the capacity of the access link 108 to the wider network. The access link 108 may use any access technology and examples include wireless, powerline, cable and DSL. The methods are equally applicable to managing access to other shared resources and to managing other small networks e.g. small enterprise networks. In particular, the methods may be implemented in networks which are trusted environments and which are not centrally controlled.

Figure 2:
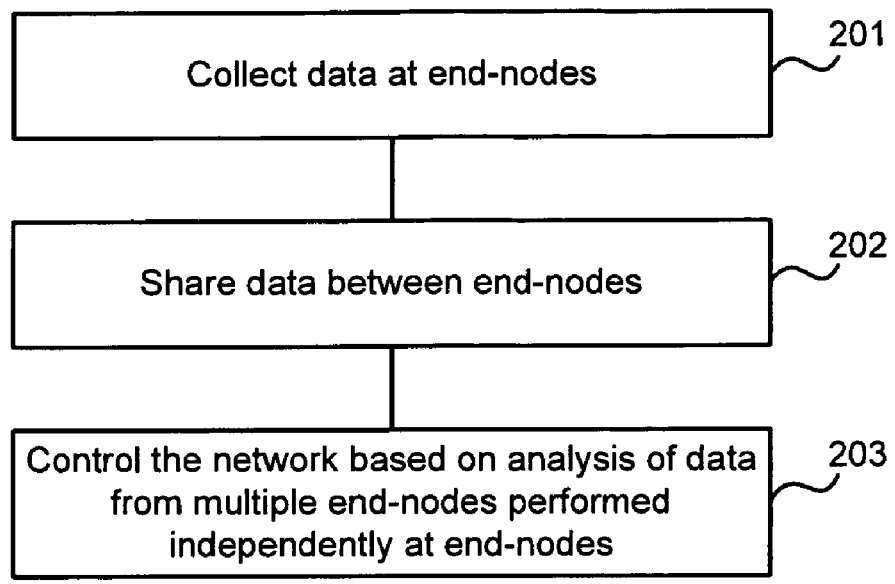
FIG. 2 is a flow diagram of an example method of network management.
Figure 3:
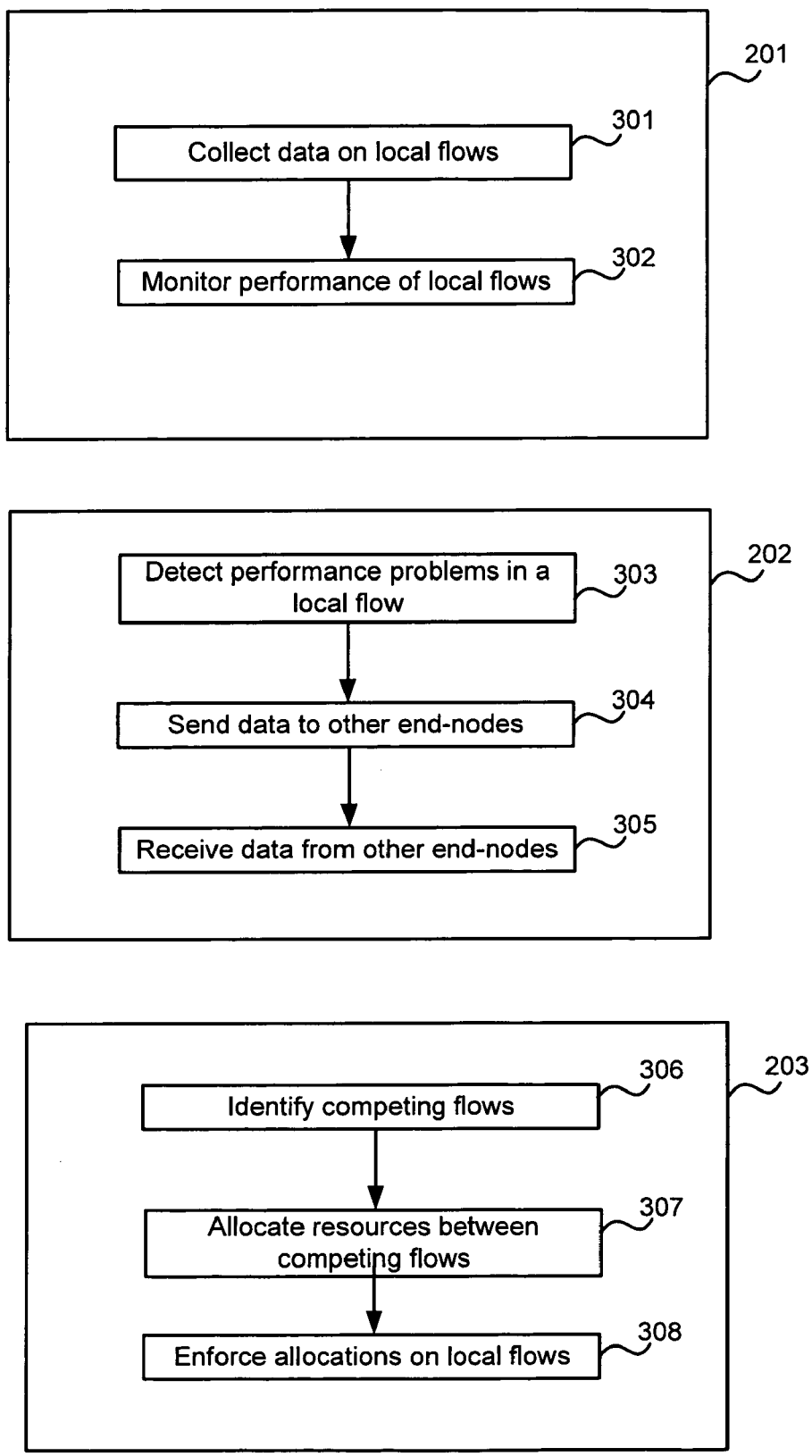
FIG. 3 shows the method blocks of FIG. 2 in more detail.

FIG. 2 is a flow diagram of an example method of network management, which may be implemented in a home network (e.g. as shown in FIG. 1) or other small network. For the purposes of the following explanation, this network, whether a home network or an enterprise network, is referred to as the local network. The method shown in FIG. 2 may, for example, be implemented in a network with tens of end-hosts or fewer. FIG. 3 shows an example of the method blocks of FIG. 2 in more detail from the perspective of a single end-host.

Data is collected at each end-host (block 201 and block 301) by monitoring the performance of all network applications at the end-host (block 302) and data is then shared between end-hosts (block 202). The performance may be defined using a variety of different metrics, such as rate or latency and may depend upon the application. The data that is shared between nodes may be all the data that is collected (in block 201), a sub-set or summary of that data or a representation of some or all of that data. Data may be shared between end-hosts (in block 202) periodically and/or after a performance problem has been identified (blocks 303 and 304) and the network is controlled (block 203) based on analysis at an end-host of data received from multiple end-hosts (in block 305).

The following pseudo-code provides an example implementation of this method of network management (with the method blocks from FIGS. 2 and 3 indicated alongside in square brackets):

```
while (true)
{
        CollectData( );              [block 201]
        if ( DetectProblems( ) )     [block 303]
        {
                DistributeInfo( );   [block 304]
                TakeAction( );       [block 203]
        }
}
```

The analysis is performed independently at each end-host and may comprise identification of competing flows (block 306), allocation of resources between competing flows (block 307) and resolution of any identified contention for a shared resource by enforcing the allocations on local flows (block 308). In an example, time-series analysis may be used to infer performance problems (in block 303) and to detect competing traffic flows across end-hosts or applications (in block 306). These problems and flows relate to a shared bottleneck in the network. The contention may be resolved (in blocks 307 and 308) through priority-based mechanisms and traffic shaping (or other resource allocation mechanisms) which assign the available capacity to applications. In the example where the shared resource is a connection 108 to a wider network 102, the capacity may be measured in terms of available bandwidth.

The method shown in FIG. 2 and described above does not assume assistance from any network equipment or from the applications running on the end-hosts or the transport protocol. While the method above indicates that each end-host in the network performs the method, in some examples there may be end-hosts which do not perform the method.

Figure 4:
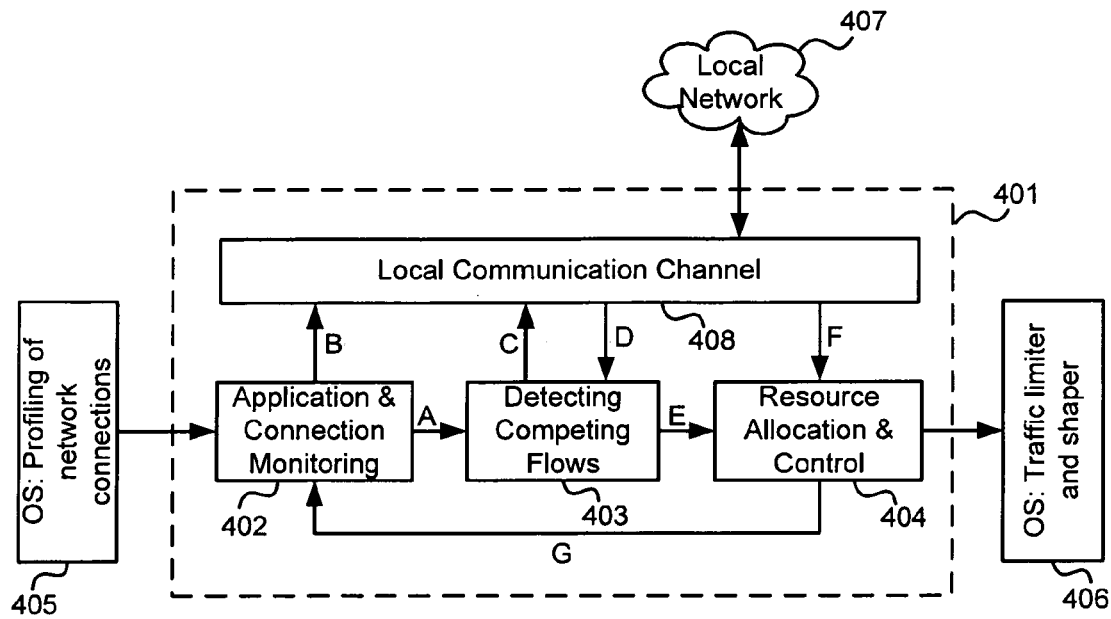
FIG. 4 is a schematic diagram of an example architecture of a network management module.

FIG. 4 is a schematic diagram of an example architecture of a network management module which performs methods such that shown in FIG. 2 and described above. The network management module 401 comprises a number of different modules 402-404. Use of such a modular design decomposes the problem and enables independent development and modification of each module, although in other examples the same functions may be performed by more or fewer modules (e.g. by a single module) and modules may perform any combination of the functions described below. These modules are:

- A monitoring module 402 which uses extensive measurements at the end-hosts to collect raw data. Statistics are provided to the detection module 403 (arrow A) and the monitoring module also occasionally and selectively broadcasts summary statistics to participating end-hosts (arrow B).
- A detection module 403 which uses time-series analysis to detect applications that compete for the same resource, such as a broadband link (e.g. link 108 in FIG. 1), or a wireless network. Identifiers for problematic connections are shared with other end-hosts (arrow C) and the resource allocation module 404 (arrow E) and data on remote problematic connections is received from other end-hosts (arrow D). The detection module also estimates the capacity of the constrained resource.
- A resource allocation module 404 which devises a nominal allocation amongst competing applications using a feedback control loop with real measurements, and enforces these allocations through rate control. The module 404 receives data from both the detection module 403 (arrow E) and other end-hosts (arrow F) and communicates resource allocations to the monitoring module (arrow G).

The module 401 interacts with elements of the operating system (OS) 405, 406 and also with other end-hosts within the local network 407 via a local communication channel module 408. The individual modules and how they operate are described in more detail below.

It will be appreciated that although FIG. 4 shows unidirectional arrows the flow of information may be unidirectional or bidirectional between modules and the arrows shown in FIG. 4 represent only a sub-set of the possible communication routes between modules.

Figure 5:
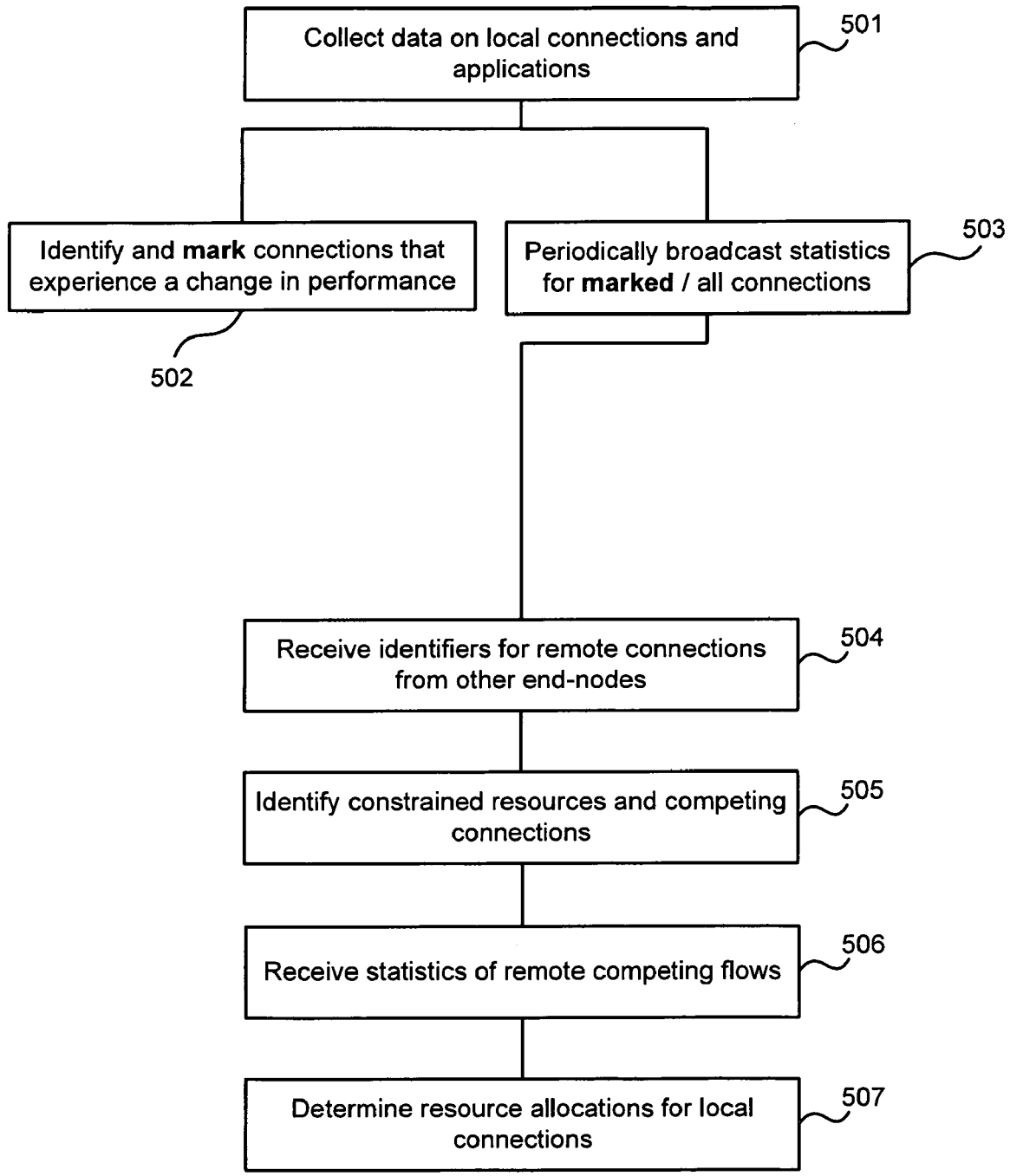
FIG. 5 is a flow diagram of an example method of operation of a network management module.

FIG. 5 is a flow diagram of an example method of operation of the network management module 401. Data on local connections (or flows) and applications are collected (block 501) e.g. by the monitoring module 402 from the operating system on the end-host. Based on the data collected (in block 501), connections that experience problems or other changes in performances are identified and marked (block 502). In an example this may be performed by the detection module 403 based on information received form the monitoring module 402. Identifiers and/or statistics for these marked connections are then broadcast to other end-hosts (block 503) and identifiers and/or statistics generated by other end-hosts may be received (block 504 and/or block 506). Based on these identified local and remote connections which may have been shared between end-hosts (blocks 503 and 504), constrained resources and competing connections are identified (block 505), e.g. by the detection module 403 which provides this information to the resource allocation module 404. Having identified constrained resources and competing connections (in block 505), resources are allocated to the local connections (block 507). The resource allocation may be based on the statistics of remote competing connections (received in block 506) and statistics on local connections (as collected in block 501).

Whilst the above description refers to broadcasting statistics of the marked connections (in block 503), in other examples, statistics may be shared for other connections in addition to the marked connections, e.g. for important connections or for all connections. In the example shown in FIG. 5, data may be shared between end-hosts after a problem is detected (e.g. after a connection is marked in block 502) or may be shared substantially continuously. In addition, end-host presence information (e.g. node-presence packets) may be shared between end-hosts to provide information on which end-hosts are active within the local network.

The terms 'connection' and 'flow' are used interchangeably herein. In many cases they are used to refer to the 5-tuple of source and destination IP addresses and ports and transport protocol. In another example, however, a flow may aggregate all the activities of a user, e.g. where a flow describes all the outgoing peer-to-peer connections, each of which is a 5-tuple. A local connection (or flow) is a connection (or flow) which has an endpoint that is local to a particular end-host, whilst a remote connection (or flow) does not have any local endpoint. A local competing connection (or flow) is a local connection (or flow) which competes for access to a shared resource. This competition may be with other local connections (or flows) and/or with remote connections (or flows). Local network activity refers to network activity over local connections or flows.

The monitoring module 402 monitors all read and write operations at the socket level to infer network-related activity. In addition, the internal TCP (transmission control protocol) state of all connections may also be measured and extensive measurements may be collected, including TCP's estimation of the RTT (round trip time), the total number of bytes/packets in and out, the number of congestion events, etc. This information may be collected at fixed time intervals (e.g. once per second, although this time interval may be user-specified) and the data, or a summary thereof, may be periodically communicated to other end-hosts (block 502). Techniques such as Event Tracing for Windows (ETW) may be used to collect the raw data on all packet arrival events at an end-host. The TCP ESTAT interface may be used to collect TCP-related metrics (e.g. using Microsoft Windows Vista Extended Statistics) and other application specific interfaces may also be used, such as statistics available from Windows Media® Player.

Furthermore, other application-specific information may be collected, such as its process name and the libraries it is using, the devices it is using (e.g. use of a microphone, which may indicate a VoIP application), the information being displayed (e.g. display of a video, which may indicate that the application is streaming video). The application-specific information may be used (by the resource allocation module 404) to infer priorities or weights for particular connections. In an example, the network management module 401 may match the process name to a database of well-known applications (e.g. in the monitoring module 402) and determine priorities based on static rules (e.g. in the resource allocation module 404); such rules may be modified by the users.

The detection module 403 uses the collected measurements to identify connections that compete for the same network resource. Time-series analysis is used to detect connections that experience significant changes in their network performance, e.g. throughput drop, or RTT increase, (in block 503). The detection module specifies 'change points' which reflect the time and type of such changes and this detection process is described in detail below. Change points and a snapshot of the time series shortly after the change are communicated to all participating end-hosts within the local network (block 504). End-hosts correlate change points across local or remote connections in order to detect applications that compete for network resources and this inference process is described in more detail below. The detection mechanism is flexible enough to be applied either at the flow or at the application level when deemed appropriate by aggregating all flows for the specific application (e.g., for peer-to-peer file-sharing applications that maintain a large set of connections active).

The resource allocation module 404 divides the capacity of the resources among the competing connections (block 508), according to some predefined priorities, and enforces the allocation by rate limiting the connections. The allocations need to utilize the network resources efficiently and at the same time provide a good experience to the end-users. Moreover, the mechanism should also work well with existing transport protocols, and the congestion control algorithm of TCP. The resource allocation and enforcement details are described in more detail below, where the components form a feedback controller.

The algorithms for detecting change points, correlating connections and deciding the rate allocations executes at each node separately, using summary knowledge about selected connections from all local machines. This avoids a requirement for a complicated coordination scheme; rather, each host reaches the same decision locally, by executing the same algorithms. Such a scheme results in weak coordination, where some hosts may apply policies a few time intervals before others. However, such time differences are in the order of a few seconds (typically less than 10). Each host broadcasts information about selected connections, such as their rates, change points, and priorities, to all other nodes in the network. This broadcast communication uses an efficient and reliable communication channel 408, with modest capacity for control traffic, for timely delivery of the information.

The communication between end-hosts within the local network may use reliable multicast through Microsoft Message Queuing (MSMQ) or any other technique. In an example, TCP may be used to share data between end-hosts. In an example the data is broadcast within the local network; however any communication paradigm, such as peer-to-peer, multiple unicast connections etc, may be used to create the same effect as broadcasting some information to local end-hosts.

Figure 6:
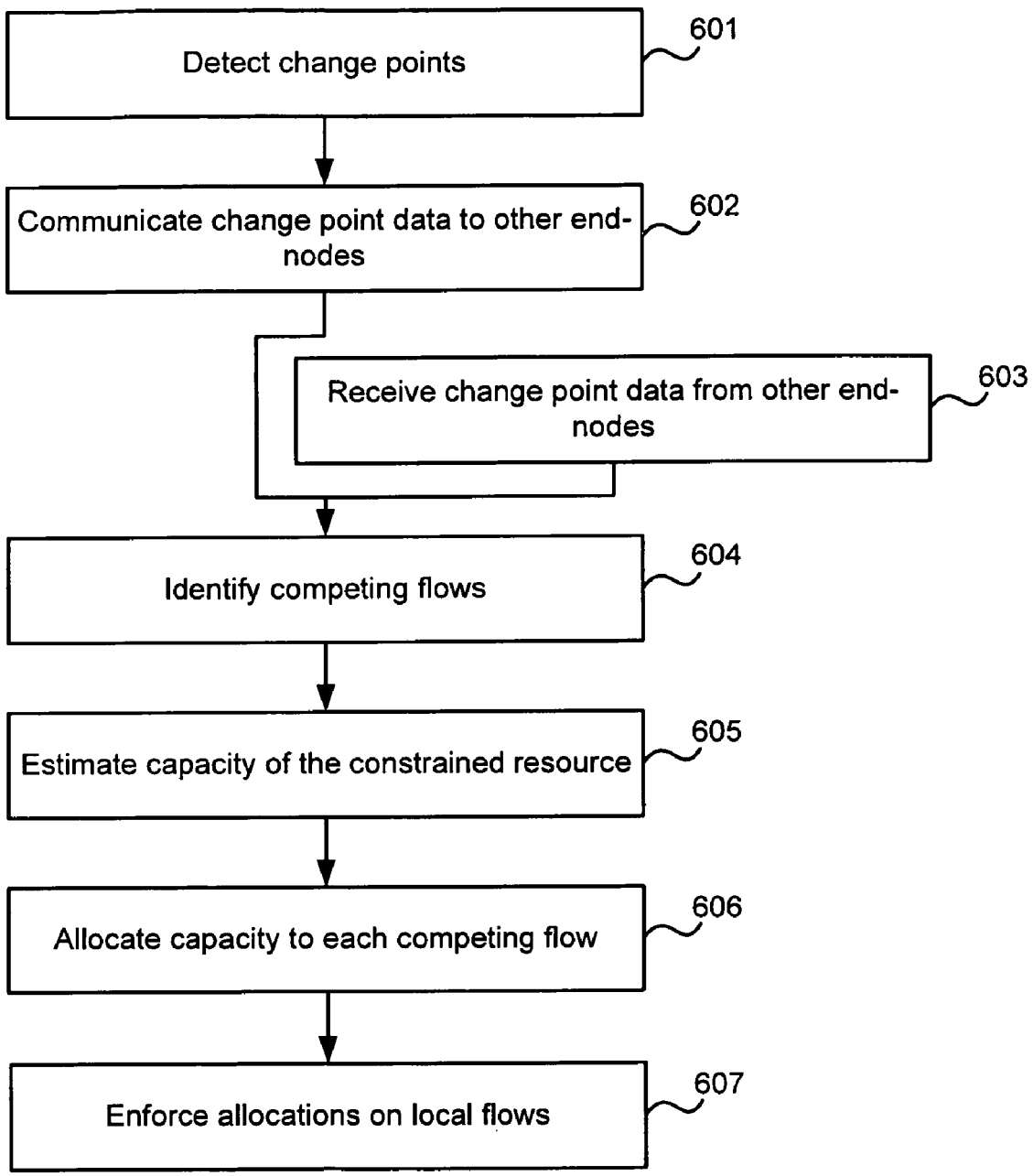
FIG. 6 is a flow diagram of another example method of operation of the network management module.
Figure 7:
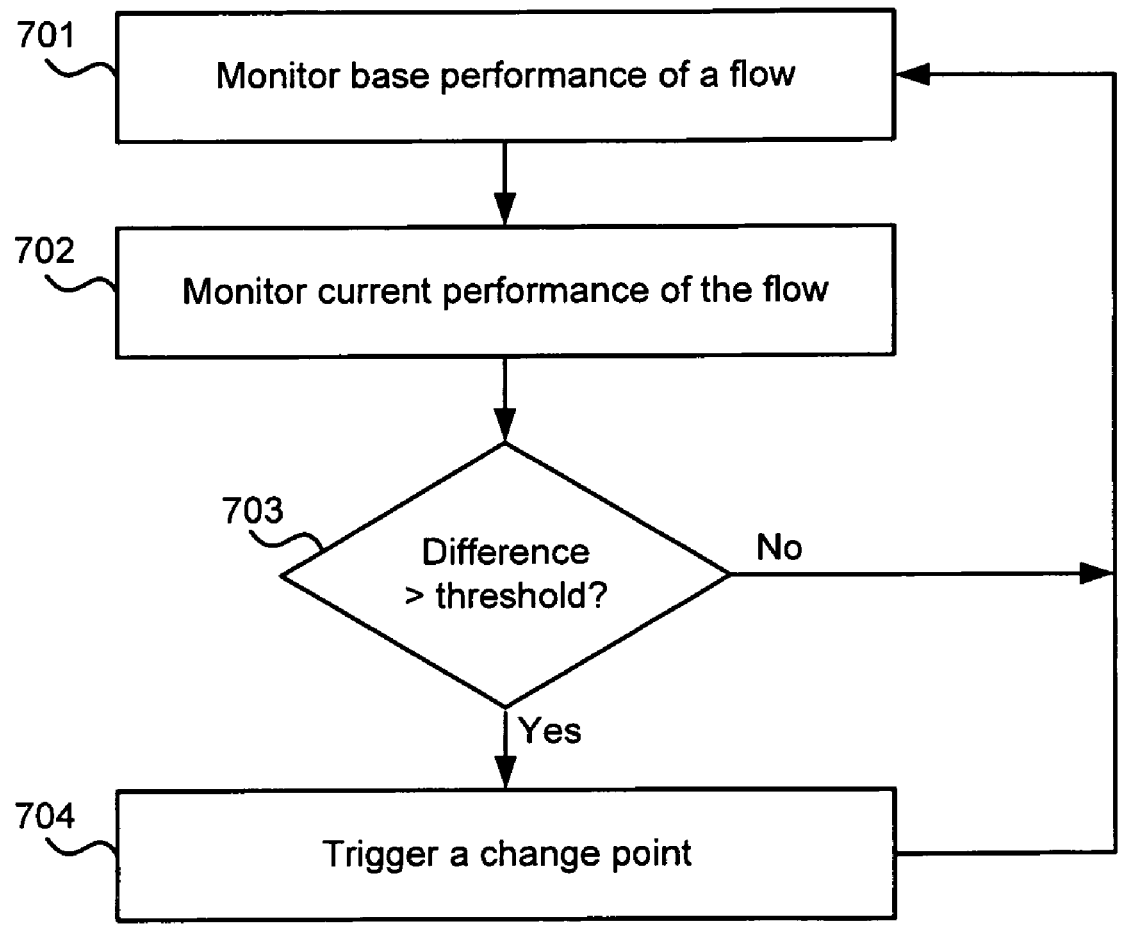
FIG. 7 shows a flow diagram of an example method for identifying change points.
Figure 10:
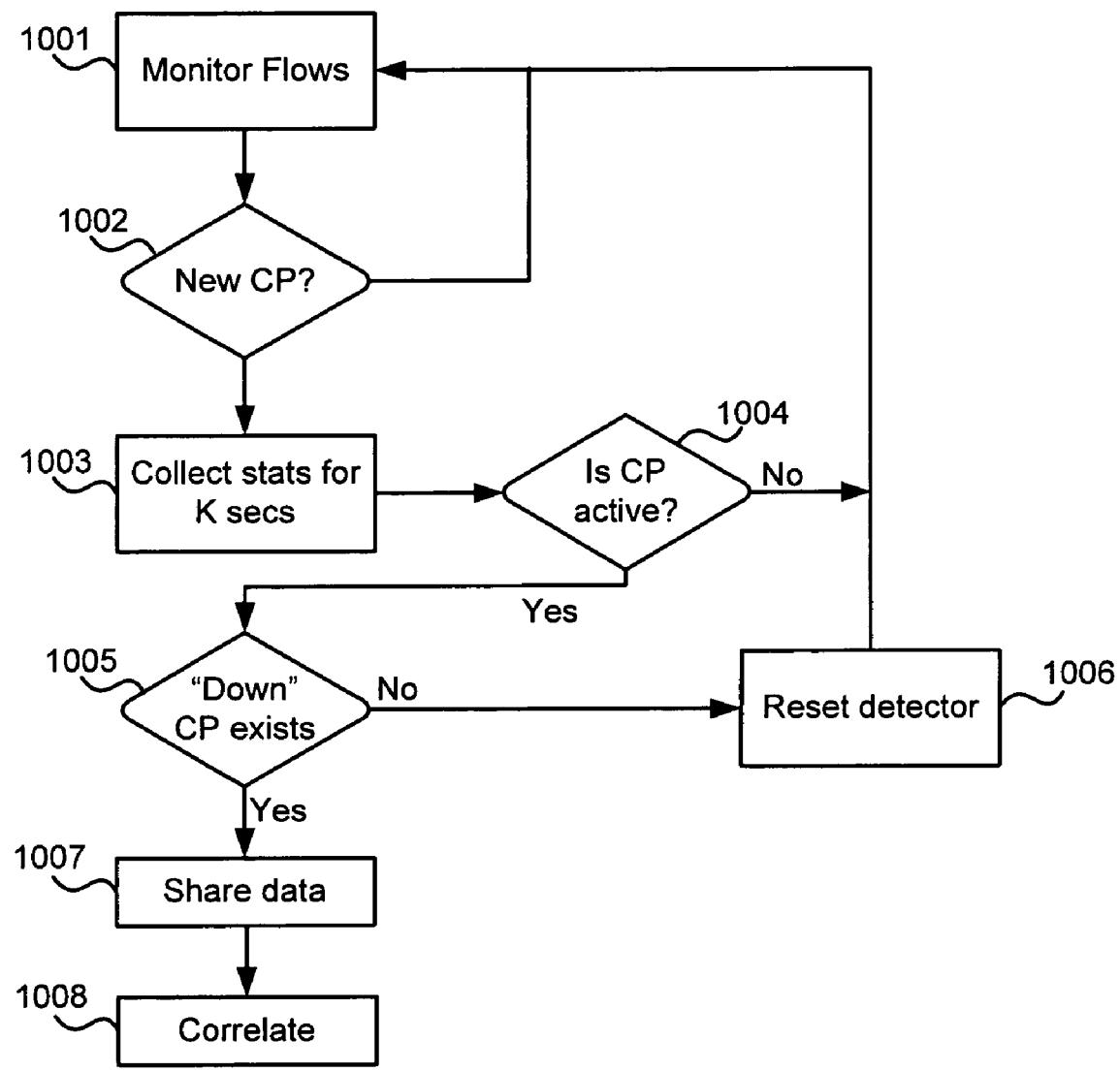
FIG. 10 is a flow diagram of an example method for identifying competing flows.
Figure 12:
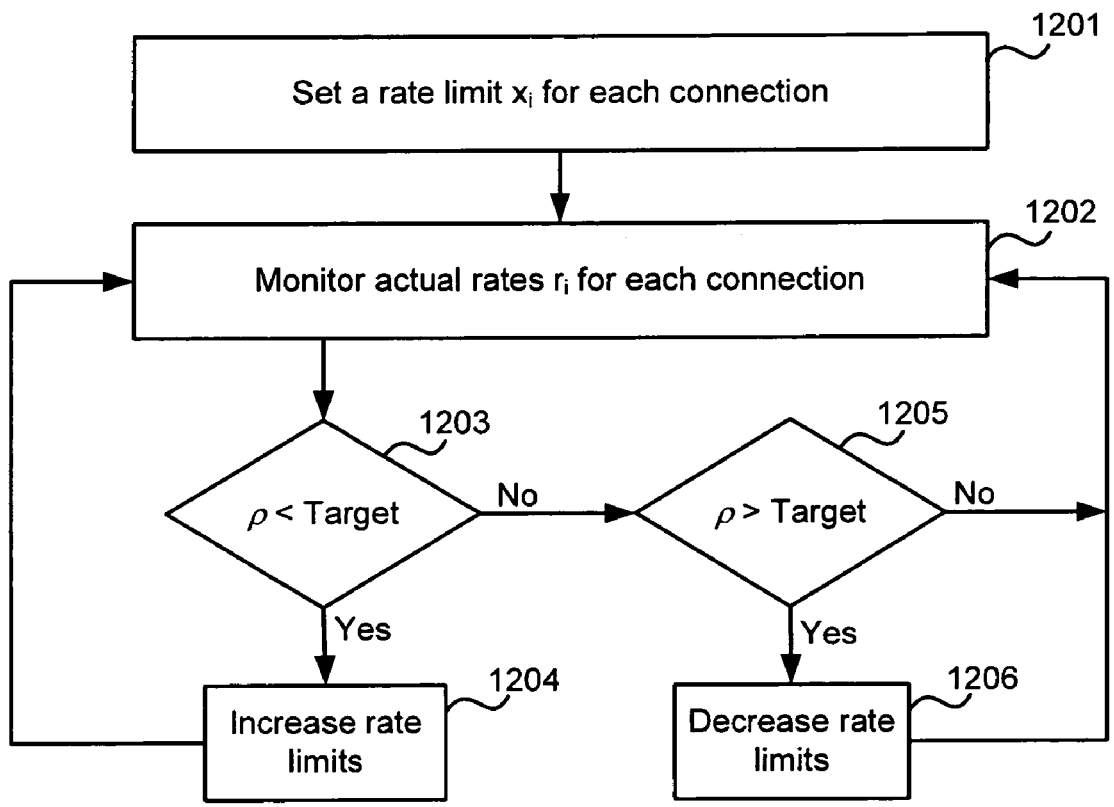
FIG. 12 shows a flow diagram of an example method of capacity allocation.

FIG. 6 is a flow diagram of another example method of operation of the network management module 401. This method shows the same operations as shown in FIG. 5 (and described above); however from a different perspective (i.e. that of identifying competing flows). The method comprises detecting change points (block 601, e.g. as shown in FIG. 7), communicating change point data (e.g. details of the change point and subsequent snapshots of data) to other end-hosts (block 602) and receiving change point data from other end-hosts (block 603). Based on the data obtained locally and received from other end-hosts, competing flows are identified (block 604, e.g. as shown in FIG. 10). The capacity of the constrained resource is estimated (block 605) and this capacity is allocated to each competing flow (block 606, e.g. as shown in FIG. 12). These allocations are then enforced on local flows (block 607).

To detect competing traffic flows, the network management module first attempts to detect flows that are likely to either experience or cause performance problems. Candidate flows are identified by detecting Change Points (CPs), that reflect significant performance change according to some metric. Three CP types may be defined: DOWN, UP, and NEW, to signal the direction in performance change or the arrival of a new significant flow, where a new flow may be defined as a new flow that is in the top-N flows in terms of bandwidth, through a threshold (e.g. a new flow with at least 5 KBps rate) or by another criteria. CPs are identified using time-series analysis applied to various monitored connection metrics. In an example metrics that relate to application specific network requirements, such as latency or bandwidth, may be used.

FIG. 7 shows a flow diagram of an example method for identifying change points. The base performance of a connection is identified using early measurements of the metric of interest and is then monitored (block 701). The instantaneous (or current) performance is also monitored (block 702) and changes are detected (in block 704) when the instantaneous performance diverges significantly from the base one (as determined in block 703). Because instantaneous measurements can be quite noisy, both the current and the base performance may be smoothed using exponential moving averages, the former tracking the latest trends of the time-series, while the latter long-term fluctuations. Once the absolute difference between the two moving averages is above a threshold (block 703), which could be defined relative to the base performance, (e.g. one tenth of the base performance), a CP is triggered (block 704) to signal change in performance.

The following pseudo-code shows an example of a method of detecting change points in detail, where basePerf is the base performance and currentPerf is the current performance:

```
begin
    window = 5 /* in seconds */
    α_fast = 0.2; /* fast moving average*/
    α_slow = 0.005; /* slow moving average*/
    timeseries.add(currentvalue);
    check = window;
    n = timeseries.Count; /* number intervals so far */
    if n==1 then
        basePerf = currentvalue; return false;
    if n < window then
        basePerf =
        α_slow * currentvalue +(1- α_slow )*basePerf;
        currentPerf = basePerf; return false;
    else
        currentPerf =
        α_fast*currentvalue+(1- α_fast)*currentPerf;
        if Abs(currentPer – basePerf) > Threshold then
            check = check – 1;
            if check==0 then
                check = window;
                return true;
        else
            basePerf =
            α_slow*currentvalue+(1- α_slow)*basePerf;
            check=window; return false;
    return false;
end
```

To avoid considering short-term performance drops or peaks as CPs, a sliding window may be applied (e.g. enforced by the check variable in the code above) before signaling a CP event. Thus, only one CP exists per window, which also minimizes the communication overhead since CPs are communicated to other hosts (e.g. in block 504 of FIG. 5 and in block 602 of FIG. 6).

The base performance variable offers context for the flows' long-term performance and does not act as a predictor for the flow's real requirements. Therefore, underestimating or overestimating the base performance is not critical, as this long-term average is reset depending on how the CP is handled (as described in more detail below).

Figure 8:
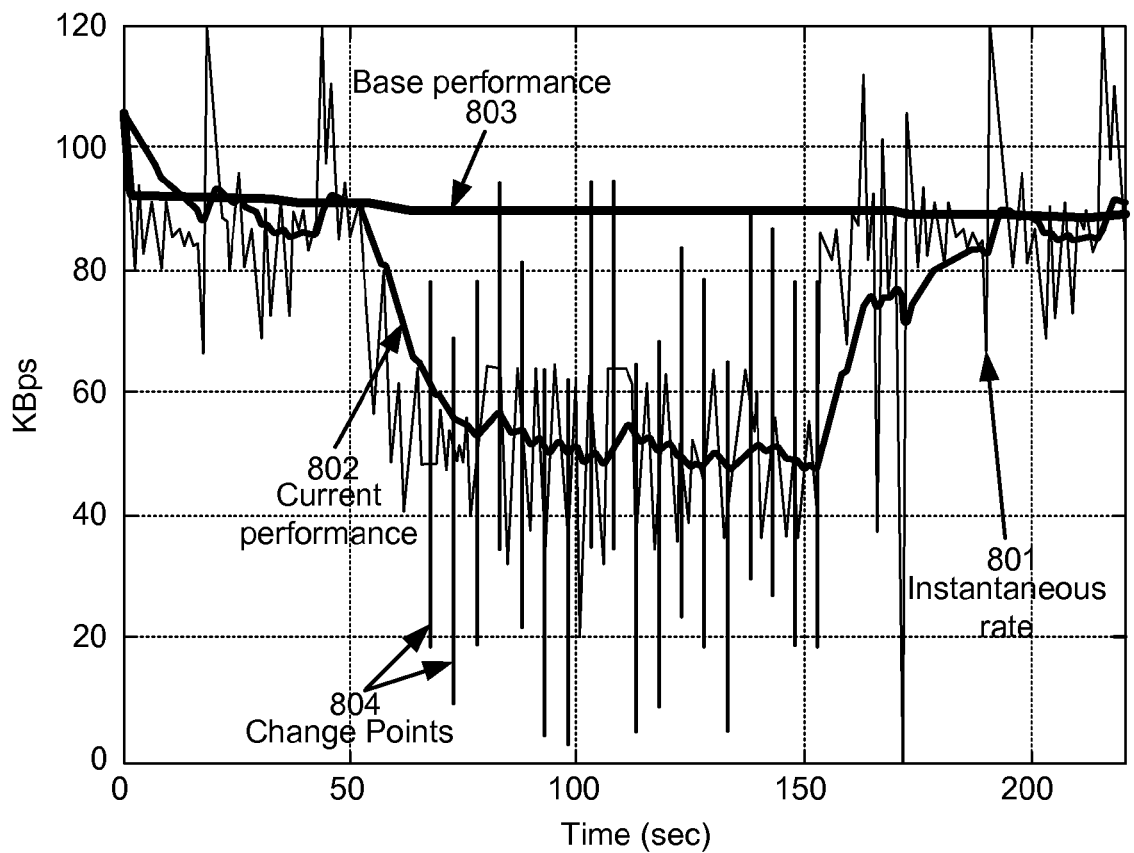
FIG. 8 shows a graph of experimental results.

FIG. 8 shows experimental results and the points at which CPs are detected. In this example, the time-series of interest is the incoming rate in KBytes per second (as shown on the y-axis). The graph shows the instantaneous performance 801 and the two moving averages of current performance 802 and base performance 803. The graph shows how the detector doesn't signal events caused by short-term peaks in the first few seconds, and how CPs 804 are fired once every window (equal to 5 seconds in this example), while the rate (i.e. the current performance) is significantly different from the base performance.

The detector algorithm described above (and shown in FIGS. 7 and 8) signals changes that are deemed significant. Flows with associated CPs are marked as candidate competing flows. However, the detector algorithm offers no clues at the cause of the change in performance, which could be the result of changing network conditions somewhere or even just reflect application behavior. Competition for resources is detected by correlating performance metrics across flows and across end-hosts, as described in more detail below.

Figure 9:
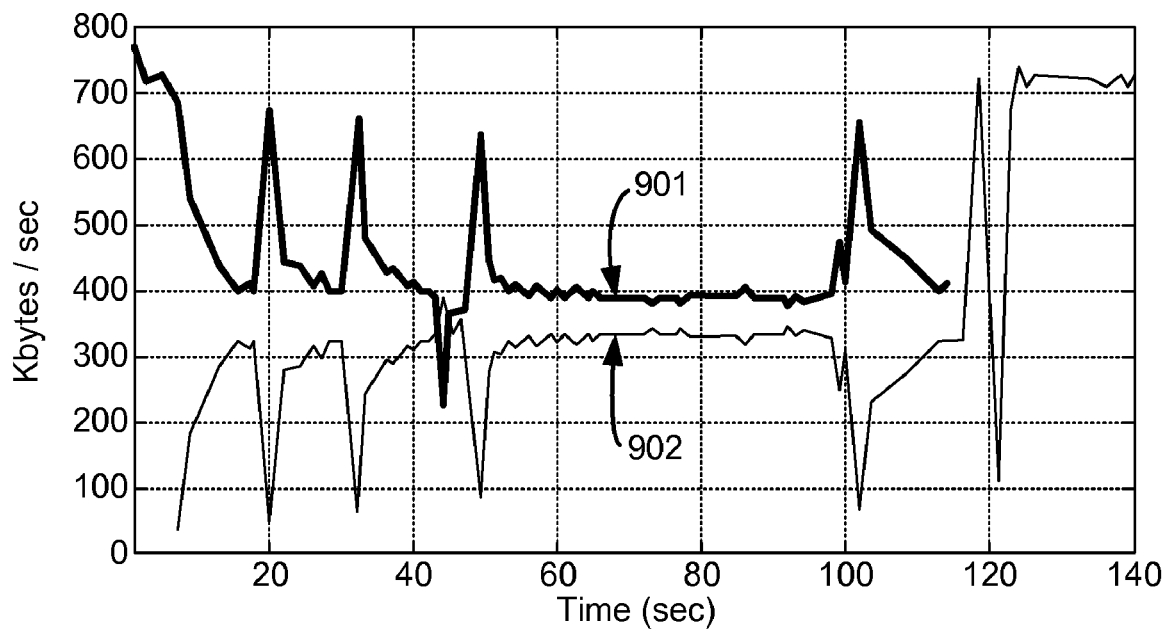
FIG. 9 shows a graph of the incoming rate of two web transfers.

All flows competing for a local resource, such as the access link or wireless, should observe performance problems during high contention periods. On the contrary, problems that only affect individual flows likely reflect application behavior or changing conditions beyond the local network (e.g. in the wider network 102 in FIG. 1). By way of example, FIG. 9 highlights a sample of two TCP flows 901, 902 competing for the access capacity. FIG. 9 depicts the incoming rate of two web transfers, one 901 starting a few seconds before the other 902, and finishing roughly 20 seconds earlier, at which point the second flow manages to get all the spare capacity. As expected, not only does the rate of one flow directly affect the other, but also their behavior appears to exhibit strong negative correlation.

The correlation between flows (e.g. the negative correlation between flows) may be determined using one of a number of correlation algorithms, such as the Pearson's cross-correlation, Spearman's rank correlation coefficient, Kendall's tau coefficient, and Wilcoxon's signed rank test. In an example, Spearman's rho coefficient may be used and the coefficient is defined as follows:

$$\rho = 1 - \frac{6\sum d_i^2}{n(n^2 - 1)}$$

where n is the number of values, $d_i$ is the difference between each corresponding rank, and ρ ranges from –1 to 1. This method may involve a comparison of packet interarrival histograms.

In an example implementation, a sliding window of 30 seconds may be used, for which the correlation was estimated using only data within the window (effectively 30 values), and then averaged the results for each time-series. That is, in a 300 second (5 minute) period, 270 different coefficients are estimated by sliding the 30-second window over the time-series, and the end correlation result is taken to be the mean of these 270 values. Such a technique enables detection of correlations as soon as possible by collecting a small number of measurements and also enables evaluation of whether the two flows correlate at any point in time, and not only at particular instances of the experiment.

Different results may be obtained dependent upon the metric used and on whether i) flows compete for the same resources, or ii) flows do not compete for the resources but still share part of the same path. In the former case, two possible metrics, the rate and the congestion avoidance counter, display significant negative correlations. In the latter case, most metrics are concentrated around zero as expected, showing no significant correlations. Another metric which may be considered is RTT. For receiving scenarios, techniques that focus on the distribution of packet inter-arrival times both in the time or the frequency domain may be used. However, experimental results show that rate is a suitable distinguishing feature for the receiving case as well.

FIG. 10 is a flow diagram of an example method for identifying competing flows (e.g. as in block 506 of FIG. 5 and block 604 of FIG. 6). The detection algorithm (described above and shown in FIG. 7) monitors all flows (block 1001) and identifies the candidate flows through CPs. Once a CP for a flow is detected (block 1002), statistics are collected for a predetermined interval K (block 1003). Previously collected statistics for the flow are not used since the period of interest is the interval after the problem is detected. If the CP is still active after K seconds ('Yes' in block 1004), the other CPs which exist either locally or remotely from other end-hosts are examined to identify the types of these CPs. If no "DOWN" CP exists ('No' in block 1005), then the detector is reset (block 1006) so that the flow's base performance is set to the currently observed performance. Since "DOWN" CPs are the ones that really signal network problems, cases where only other types of CPs exist may, as in this example, be ignored. If such a "DOWN" CP does exist ('Yes' in block 1005), data is shared between end-hosts (block 1007) and all (or a subset of) current CPs are correlated (block 1008), e.g. using pairwise correlation between flows. If the correlation score is less than a threshold (e.g. −0.4), these flows are considered as competing.

The method shown in FIG. 10 produces sets of competing flows, e.g. flows {A,B,C} are correlated and thus competing, while C is also competing with D in another set of correlated flows {C,D}. Where more than one set of competing flows is identified, this indicates competition at different points in the network (e.g. the wireless medium and the access link) or competition in relation to different shared resources (e.g. the access link and a network attached storage device).

Figure 11:
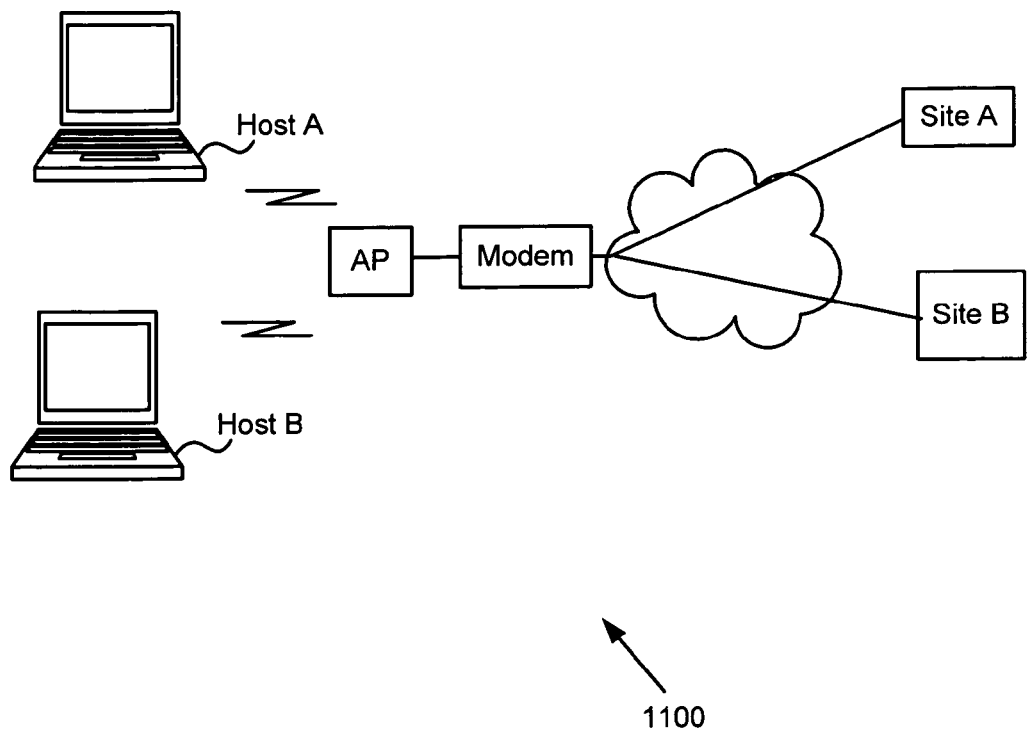
FIG. 11 shows a schematic diagram of an experimental network and graphs of experimental results obtained in such a network.
Figure 11:
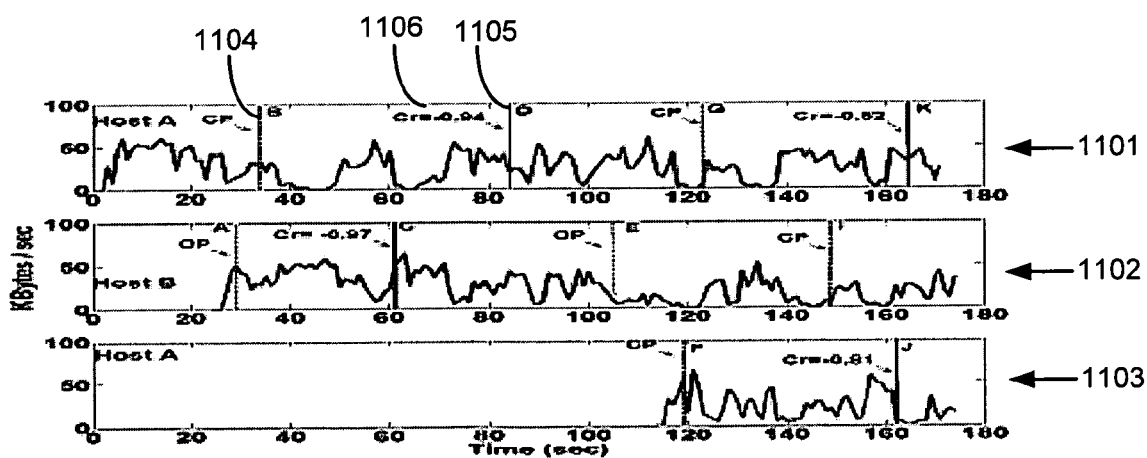

The detection of competing flows can be illustrated with reference to the example shown in FIG. 11, which shows both a schematic diagram of the network and graphs of the results. FIG. 11 shows experimental results 1101-1103 from an experiment in a home network 1100, where three upstream flows 1101, 1102, 1103 competed for the access capacity. Two of the flows 1101, 1103 were initiated at host A, while the third 1102 at host B. The dashed lines 1104 reflect times where CPs were first detected for a flow, while solid lines 1105 show correlation events. The letters in each line represent the chronological order of the events as seen in the two hosts and each correlation event is labeled with the resulting correlation score (e.g. 1106).

The arrival of the flow in Host B resulted in two CPs: first, a NEW-type (point A) CP from host B, and then a DOWN-type one (point B) from host A. The DOWN event (point B) is fired a few seconds later than the noticeable drop in the flow performance and this delay is caused by the effect of the smoothing and the window used in the detector. From this point, the two hosts exchange messages with statistics for the corresponding CPs, and once enough values have been collected, each host separately evaluates the correlation score, since there exists an active DOWN CP. The time difference in the correlation evaluation reflects the distributed nature of the methods described herein, where each host locally evaluates correlations. At point E, the flow at Host B, experiences further performance drops, and another CP is fired which however is not handled since no other CPs exist in that time interval (corresponding to a 'No' in block 1005). Once the third flow is initiated, CPs are fired at points F (NEW), G (DOWN) and I (DOWN) and correlation occurs once a sufficient number of statistics are collected.

The methods described above which involve local execution of the detection and correlation algorithms (e.g. as shown in FIGS. 7 and 10) allow correlation of events and identification of competing flows across applications and across end-hosts with a minimal network overhead. By use of CPs, the amount of data which is shared between end-hosts is reduced.

A sharing mechanism may be used to allocate resources to connections (and effectively applications) that is based on weighted proportional fairness (e.g. in block 508 of FIG. 5 and block 606 of FIG. 6). The mechanism described below respects TCP's congestion control loop, and is provably stable. For purposes of explanation only, a single constrained resource is considered (e.g. the upstream of the Internet access link) which has an (estimated) capacity of $\hat{C}$ and "real" (or actual) capacity C. The capacity of the constrained resource is estimated (e.g. in block 605 of FIG. 6) as a side-effect of the correlation mechanism described above. The sum of the rates of all competing connections (as distributed in block 1007 of FIG. 10) provides information on the capacity of the constrained resource and in an example, the congestion of the upstream link may be estimated by adding the instantaneous rates. As the sum of the current instantaneous rates is a noisy measurement, the 95th percentile of the observed distribution may be used instead as the capacity measure. This small underestimation of the total capacity ($\hat{C}$=0.95C in expectation) results in a small utilization penalty but improves the ensure stability of the control algorithm and minimizes queuing delay. It is assumed that all hosts have information for all connections i that use the resource and their associated rates $r_i$. The rates $r_i$ are collected and broadcasted periodically, so the values of the rates $r_i$ are delayed estimates. The sharing mechanism adapts the rates of the connections (through rate limiting) in order to achieve a target resource utilization of individual allocations that satisfies weighted proportional fairness.

FIG. 12 shows a flow diagram of an example method of capacity allocation which does not require information on the bandwidth demand from each application. This information on the bandwidth demand may not be available without explicit signaling from the applications. At time t, each connection i is rate limited to a value $x_i(t)$ (block 1201). The actual rates of each connection are monitored (block 1202, and as described above) and a connection may actually use rate which is less than the rate limited value (i.e. $r_i(t) < x_i(t)$). The estimated utilization is given by:

$$\rho = \sum_i \frac{r_i(t)}{\hat{C}(t)} = \frac{R(t)}{\hat{C}(t)}$$

where R is the sum of rates. If the utilization, ρ is below a target objective ('Yes' in block 1203), then the rate limits $x_i(t+1)$ are increased (block 1204) which induces changes in the actual rates $r_i(t+1)$. There may also be a mechanism (blocks 1205-1206) for decreasing the rate limits (block 1206) if the utilization is above a target objective ('Yes' in block 1205). The resulting rates are monitored (in block 1202) and the process is repeated whilst the flows compete.

An example mechanism for increasing (or decreasing) the $x_i$ (in blocks 1204 and/or 1206) which provides weighted proportional fairness, is described in detail below. The resulting change in R leads to a new utilization ρ' and by changing the rate limits the target utilization can be achieved (assuming sufficient demand).

In an example, the rate cap $x_i(t)$ may be changed in direct proportion to the observed changes in utilization ρ; however this can lead to high oscillations in the assignments and instability, which result in bad performance. Instead, a probability of congestion, the so-called marking probability, $p=\rho^B$ may be used to control the rate limits, where B is a small constant (e.g. B=5). If the constrained resource is modeled as an M/G/1 queue (which is a queue which has exponentially distributed interarrival times and an arbitrary distribution for service times) with arrival rate $\rho$ and service rate $\hat{C}$, then the marking probability expresses the probability that an arriving packet finds more than B other packets in the queue. Since $E[\hat{C}]=0.95C$, this is an example of a Virtual Queue strategy and is used to signal early warnings of congestion for resource with capacity C. In this example, a distributed Virtual Queue is used such that each end-host simulates the operation of a virtual queue for every constrained resource, with the competing flows being determined, for example, as described above with reference to FIG. 10 and the capacity determined as described above. The virtual queue is simulated by using the rates of the competing flows to determine the utilization $\rho$ of the resource, and the marking probability $p$ that a queue with the same average $\rho$ would observe.

In an implementation, the $x_i$ may be adapted (in blocks 1204 and/or 1206) to achieve a utilization that satisfies the following objective:

$$\rho = \alpha \frac{1-p}{p} = \alpha \frac{1-p^B}{p^B} \qquad (1)$$

where $\alpha$ is a small scaling parameter (e.g. $\alpha=1$). In the example where $\alpha=1$ and B=5, the target utilization is 0.88, which is a good compromise between efficiency and network responsiveness (i.e. small queuing delay).

The initial values of the rate limits $x_i$ may be set (in block 1201) based on relative priorities that enforce a form of weighted proportional fairness. A weight $w_i$ is associated with each application, and if there is a single resource, then the amount of resource allocated to each application is proportional to $w_i$. The weight and the rate limits may be related via:

$$x_i = w_i \frac{1-p}{p} \qquad (2)$$

which is the per-connection equivalent to equation (1) above.

To achieve the objective utilization as given in equation (1) and rate assignments proportional to $w_i$, the rate cap $x_i$ of connection i may be adapted as follows:

$$x_i(t+1) \leftarrow x_i(t) + \kappa x_i(t)\left[(1-p(t)) - p(t)\frac{x_i(t)}{w_i}\right] \qquad (3)$$

where $\kappa$ is a gain parameter that determines the rate of convergence and in many examples:

$$\kappa \leq \frac{1}{B+1}$$

and the time t to t+1 is the control interval M. The values of the weights $w_i$ are scaled to satisfy:

$$\sum_i w_i = \alpha C$$

A minimum value rate cap may be fixed (e.g. $x_{min}=2$ KB/s) so that the values of the rate caps remain positive:

$$x_i(t+1) \rightarrow \max\{x_{min}, x_i(t+1)\} \qquad (4)$$

When the system converges ($x'_i=x_i$), then equation (2) is satisfied and if all connections use their allocated capacity, equation (1) is satisfied.

The nodes determine the utilization of the resources (e.g. in block 1202) every M seconds (e.g. M=4 seconds) and this includes measuring the rates of the local connections which are correlated and compete for the constrained resource and broadcasting the rates. Using control theory techniques it can be shown that the delayed feedback algorithm given in equation (3) above is stable provided that K is sufficiently small, i.e. provided that:

$$\kappa \leq \min\left(\frac{1}{B+1}, \frac{M}{RTT}\right)$$

and given a large observation window (M), this becomes:

$$\kappa \leq \frac{1}{B+1}$$

Figure 13:
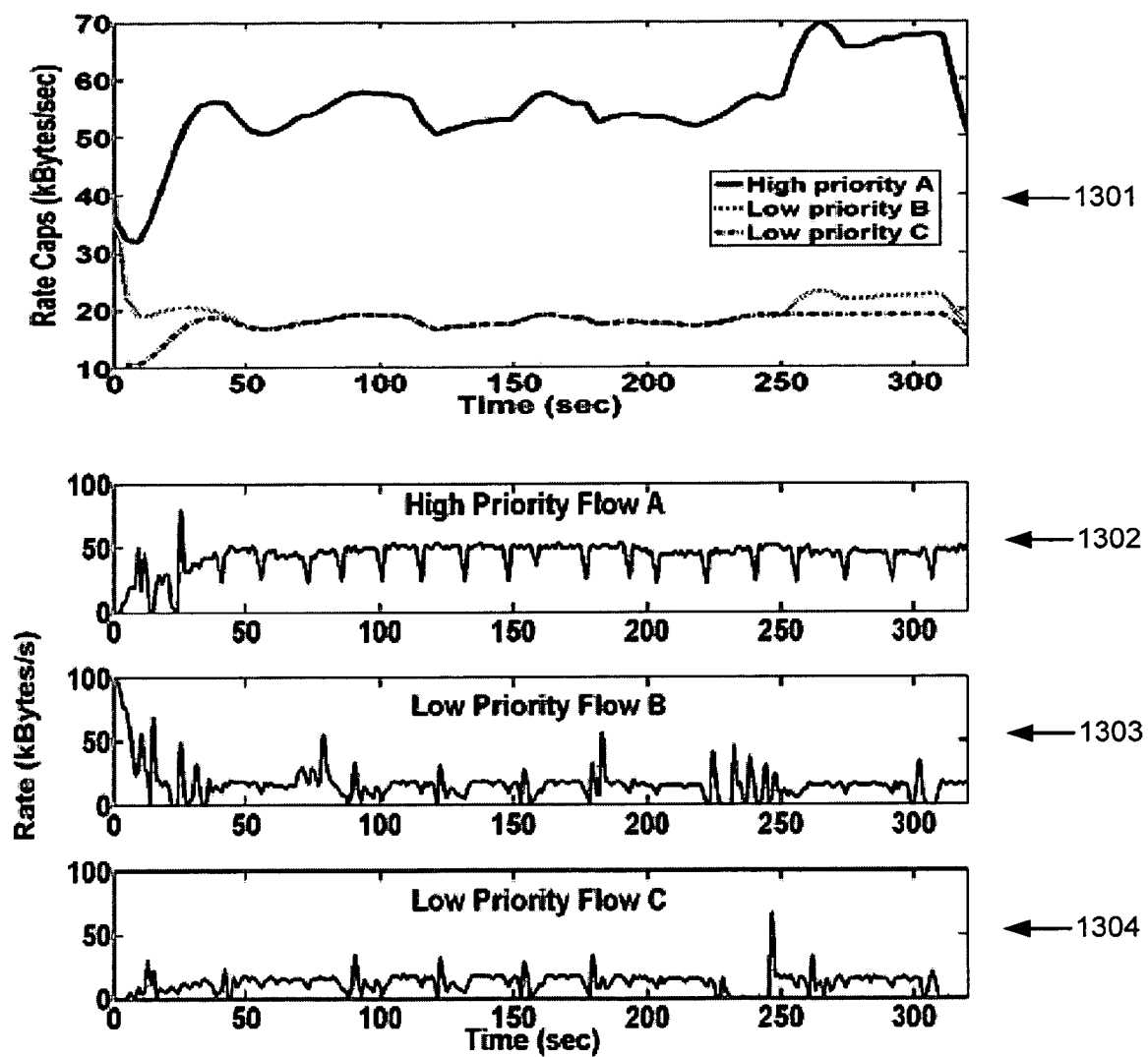
FIG. 13 shows graphs of experimental results.

FIG. 13 shows experimental results obtained using equation (3). These results were obtained in a home network in which three upstream connections were initiated and where the estimated upstream capacity was approximately 800 kbps. One of the connections was configured to have three-times the priority relative to the other two (i.e. $w_1=3w$, $w_2=w_3=w$. The experiment used ping to get an estimate of the queuing delay in the access link and this queuing delay was small. The first graph 1301 in FIG. 13 depicts the rates allocated by the rate controller to the three flows and it can be seen that the rate caps ($x_i$) for the high priority flow is roughly three times higher than the rate caps of the other two. The low priority flows received similar rates. The results show that the rate controller spent roughly 20 to 30 seconds converging to the desired rate, and after that initial period the rate remained relatively stable.

The lower three plots 1302-1304 in FIG. 13 depict the actual rates (or goodputs) received by each of the three flows. In this particular experiment, the low priority Flow B started first and initially used the entire upload capacity (as shown in graph 1303). During the observation period, Flow A indeed experienced a better rate than Flows B and C; the actual ratios of rates were 3.8 and 3.6. While the ratios were not equal to the target ratio of 3, they were a close approximation and any difference was not due to the rate controller, which estimated the correct values for the rate caps (as shown in graph 1301). The fluctuations observed in the graphs relate to TCP behavior and not to the limits set by the rate control mechanism. For example, at around t=225 sec, a congestion event is observed for the low priority flows in this experiment. Since both of them reduced their rates, capacity was freed for the high priority rate and the controller smoothly adapted the limits accordingly, avoiding further instabilities. When congestion ended, flows returned to their intended rates. In this particular experiment, a virtual queue with B=5 and α=1 were used. Overall, goodput and total rate observed were G/T=0.81 and T/C=0.82.

The values of the weights $w_i$ used may take into account user priorities and intentions. The values of the weights may be set by a user or may be adapted by the user to express intentions. In an example, the weights $w_i$ may be set as functions of the desired connection rates and these weights may be interpreted as the "willingness-to-pay" of an application. If $x_i$ is in bytes, then w represents the per-byte willingness to pay. Following from equation (1):

$$w_i = x_i \frac{p}{1-p} \quad (6)$$

which implies that $w_i$ should be of the same order as the rate that is desired for $x_i$. To allow the system to be run at full rate $$\sum_i x_i = \alpha \hat{C}$$

as described above.

One way to set initial weights is to set $w_i = Mx_i$, where $x_i^{target}$ is a nominal target rate for the connection, and $$M = E\left[\frac{p}{1-p}\right]$$

For example, with B=5 and α=1 this implies ρ=0.88 and M=7.4. In other examples, arbitrary weights may be used or target rates could be set using history, or application characteristics (e.g. as described above). In some examples, the relative weights may be adjusted by the user.

The enforcement of the rate caps on local flows (e.g. in block 607 of FIG. 6) may use any suitable method, such as a token bucket algorithm or other traffic shaping algorithm. In an example, the Windows Traffic Control API may be used. In another example, acknowledgements may be throttled on incoming connections.

The methods described above assume some type of weak synchronization between end-hosts (e.g. on the scale of seconds), since cross-node correlations are estimated through time-series analysis. For example, in an example implementation, the end-hosts may be synchronized through NTP (Network Time Protocol) every 10-15 minutes.

In further variations of the methods described above, additional information, such as network topology or IP addresses, may be used to assist in determining the shared resources and/or the type of flow. In a first example, those connections which cross the Internet access link can be determined by examining their IP addresses, e.g. by identifying the local subnet by using the IP address and the subnet mask and hence the connections that cross the access link. In a second example, information about the network interface may be used to infer whether the interface is wireless or wired. Additional information about the interface (such as nominal rate, etc) may also be accessed. In a third example, a network topology mapper may be used to get more detailed information about the network topology and the network bottlenecks. All these examples provide additional heuristics to determine which connections compete for the same resources. By using multiple heuristics, a user can be more certain (when they agree) that the system is addressing the correct constrained resources and competing flows. In further examples, resources may provide information on their capacity and therefore the capacity estimation step may not be required.

In a further variation of the methods described above, a user notification may be provided to inform the user of the source of the congestion. This notification may be provided in addition to, or instead of, resolving the contention, as described above.

The methods described above may be reactive in their approach, such that congestion may temporarily build up and users will suffer some performance degradation for a few seconds; however, the methods control the extent of such congestion events, and in time the system converges to the desired configuration. Alternatively, where explicit signaling from the applications regarding their network requirements is provided, a proactive solution may be adopted. Reactive techniques, such as described above, are more suited to situations where usage demands and behavior can be quite unpredictable.

The methods described above require little or no user input and operate autonomously within the end-hosts of the local network, i.e. the methods may be transparent to users. A user may, however, specify priorities which maybe used to determine weights or otherwise adapt the weights.

Although the methods described above refer to a process being performed at each end-host, in some situations there may be end-hosts which do not perform the method, (i.e. they do not participate in the network management virtual network). Whilst priorities cannot be enforced on these devices, the detection algorithms described above will still identify performance problems and in some examples these may be reported to the user. Control may be imposed on these devices using a network element, such as a router or access point, which may, for example, expose an API for end-hosts to query for network statistics, and may set parameters on a per-flow basis. Such a network device may then exert control by shaping traffic sourced at or destined for such end-hosts which are outside the virtual network. A protocol may be defined by which end-hosts join and leave the virtual network.

In the examples above, the data is shared between end-hosts using broadcast or multi-cast techniques. These techniques may be applied over a single sub-net or across multiple sub-nets although this may require configuration of the communications channel which is used to share data between end-hosts.

The methods are described above in relation to TCP traffic, however this is by way of example only. The methods are also applicable to UDP traffic and in such a situation, the methods may be implemented at the sender and not the recipient (due to the absence of a feedback loop). Specific rules may be used to enforce priorities dependent upon the traffic type.

The network management module described above may, in some examples, explicitly inform lower transport layers of their networking requirements to facilitate reservations or an Integrated Services type solution.

Whilst the methods described above perform on a per-flow basis, they may alternatively perform on a per-application or on a per-host basis.

Figure 14:
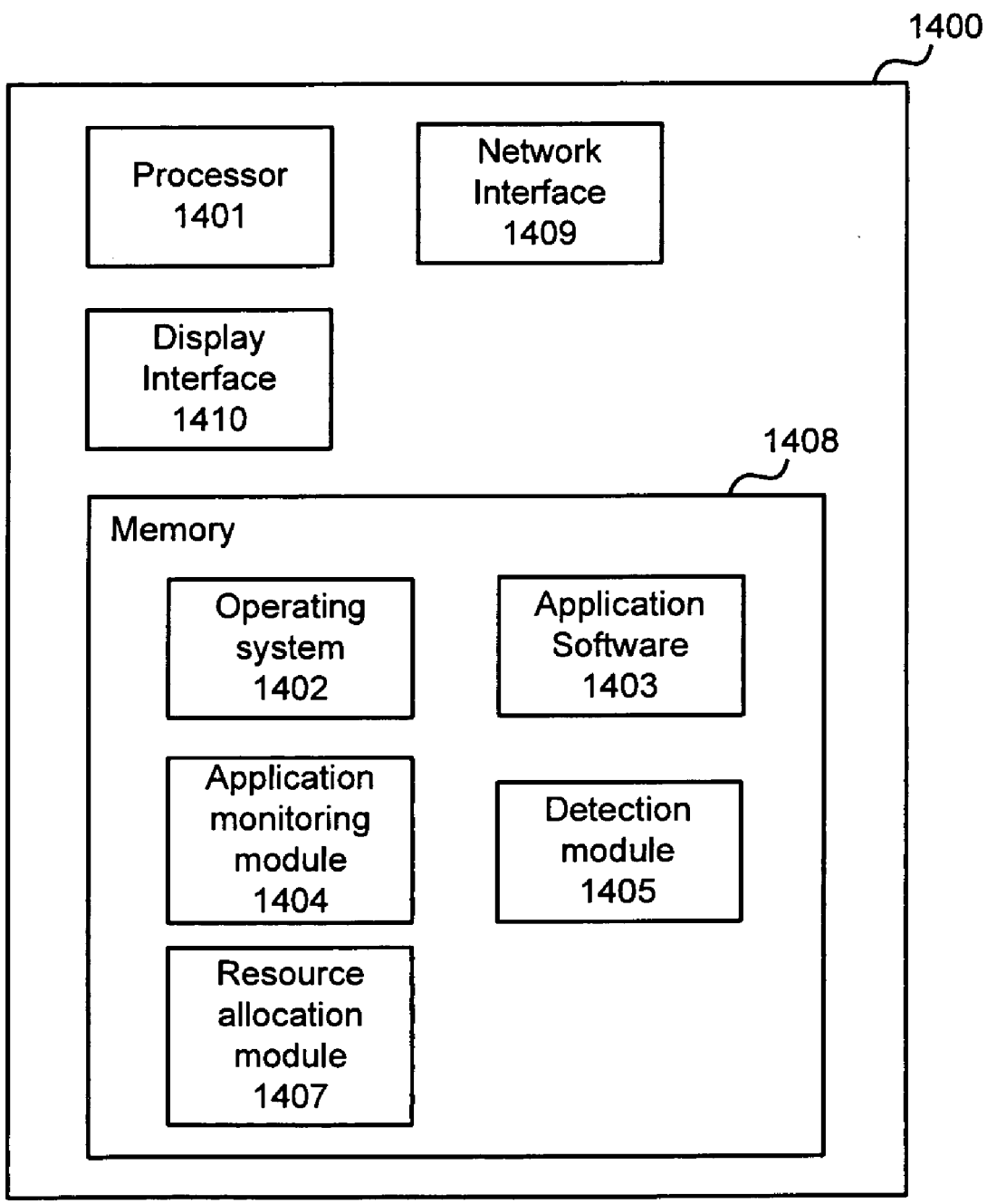
FIG. 14 illustrates an exemplary computing-based device in which embodiments of the network management methods described herein may be implemented.

FIG. 14 illustrates various components of an exemplary computing-based device 1400 which may be implemented as any form of a computing and/or electronic device, and in which embodiments of the methods described above may be implemented.

Computing-based device 1400 comprises one or more processors 1401 which may be microprocessors, controllers or any other suitable type of processors for processing computing executable instructions to control the operation of the device in order to perform the network management methods as described above. Platform software comprising an operating system 1402 or any other suitable platform software may be provided at the computing-based device to enable application software 1403-1407 to be executed on the device.

As described above, the operating system 1402 may perform the raw data collection (e.g. using ETW) or alternatively application software may be provided to collect the raw data (not shown in FIG. 14). The application software comprises a network management module 1404 (e.g. as also shown in FIG. 4), which may comprise one or more modules, such as an application monitoring module 1405, a detection module 1406 and a resource allocation module 1407.

The computer executable instructions may be provided using any computer-readable media, such as memory 1408. The memory may be of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1400 comprises a network interface 1409 for connection to the local network and may also comprise one or more inputs (not shown in FIG. 14) which are of any suitable type for receiving media content, Internet Protocol (IP) input etc. The computing-based device 1400 also comprises a display interface 1410 such as an audio and/or video interface to a display system integral with or in communication with the computing-based device. The display system may provide a graphical user interface, or other user interface of any suitable type. Further outputs may also be provided (not shown in FIG. 14).

Although the present examples are described and illustrated herein as being implemented in a home network, the system described is provided as an example and not a limitation. As those skilled in the art will appreciate, the present examples are suitable for application in a variety of different types of networks.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more computer-readable storage media, storing processor-executable instructions that, when executed on a processor, perform acts comprising:

collecting local network activity data of a local network at an end-host device to create a base performance trend for each network device, the local network comprising a plurality of other end-host devices;

monitoring, at each end-host device, instantaneous local network activity;

triggering a change point, at the respective end-host device, if the instantaneous local network activity of the respective end-host device that deviates from the base performance trend for the respective end-host device, the change point indicating either an increase or decrease in performance for the respective end-host device;

collecting, if the change point at the respective end-host device is triggered, the network activity of the respective end-host for a predetermined amount of time to determine a duration of the change point;

notifying, if the duration of the change point is longer than the predetermined amount of time, each end-host device of the change point;

correlating, at each end-host device, all change points sent and received within a predetermined time window at the end-host device to determine which end-host devices are in competition with the respective end-host device; and controlling, by each end-host device, local network activity based on analysis of the collected local network activity data and other network activity data received from the plurality of other end-host devices within the local network wherein sharing the collected local network activity data with the other end-hosts within a network further comprises:
detecting a performance change in the local network activity; and
sending data relating to the performance change to each of the other end-host devices within the local network.

2. One or more computer-readable storage media according to claim 1, wherein detecting a performance change in the local network activity comprises:
monitoring a base performance of a local flow;
monitoring a current performance of the local flow; and
detecting a performance change when a difference between the base performance and the current performance exceeds a threshold.

3. One or more computer-readable storage media according to claim 2, wherein the data relating to the performance change comprises an indication of a type of performance change, wherein the type of performance change comprises one of: a new flow, an increase in performance and a decrease in performance.

4. One or more computer-readable storage media according to claim 1, wherein controlling local network activity based on analysis of the collected local network activity data and other network activity data received from the plurality of other end-host devices within the local network comprises:
identifying competing flows within the local network; and
allocating resources to local competing flows based on the collected local network activity data and data received from the plurality of other end-host devices.

5. One or more computer-readable storage media according to claim 4, wherein identifying competing flows within the local network comprises:
determining, on detection of a performance change in a local flow, when a reduction in performance occurred in a second flow within the local network within a defined time period; and
performing a pairwise correlation between data for the local flow and data for the second flow.

6. One or more computer-readable storage media according to claim 4, allocating resources to local competing flows based on the collected local network activity data and data received from the plurality of other end-host devices comprises:
setting a rate limit for each local competing flow;
determining an actual rate for each local competing flow; and
adjusting the rate limits to achieve a target utilization of a shared resource.

7. One or more computer-readable storage media according to claim 6, wherein the competing flows relate to a shared resource and wherein allocating resources to local competing flows based on the collected local network activity data and data received from the plurality of other end-host devices further comprises estimating a capacity of the shared resource.

8. One or more computer-readable storage media according to claim 6, wherein the rate limit for each local competing flow is set based on a weight for the flow and wherein the weight is set based on at least one of: user input and flow type.

9. One or more computer-readable storage media according to claim 4, wherein controlling local network activity based on analysis of the collected local network activity data and other network activity data received from the plurality of other end-host devices within the local network further comprises enforcing an allocation of resources on local competing flows.

10. A local network comprising:
a plurality of end-host devices, wherein each end-host device comprises:
a processor;
a network interface; and
a memory arranged to store executable instructions to cause the processor to:
collect data about local data flows transmitted and received via the network interface;
trigger a change point, at the respective end-host device, if the instantaneous local network activity of the respective end-host device deviates from the base performance trend for the respective end-host device, the change point indicating either an increase or decrease in performance for the respective end-host device;
collect the network activity of the respective end-host, if the change point at the respective end-host device is triggered, for a predetermined amount of time to determine a duration of the change point; and
control local network activity by performing network management of local flows based on information shared between each end-host device, the information comprising local network activity data collected at each end-host device, stored at each end-host device, sent from each end-host device to each of other end-host devices within the local network, and each end-host device independently correlating the information sent from each of the end-host devices that are received within a predetermined time window the memory is arranged to store additional executable instructions to cause the processor to:
transmit data relating to at least one of the local data flows to each of the other end-host devices within the network;
receive data on remote data flows in the local network from each of the other end-host devices within the local network; and
control at least one of the local data flows based on the transmitted and received data.

11. A local network according to claim 10, wherein the local network further comprises a shared resource and wherein each end-host device is arranged to independently operate a virtual queue for the shared resource.

12. A local network according to claim 10, wherein the executable instructions to cause the processor to transmit data relating to at least one of the local data flows to each of the other end-host devices within the local network comprise executable instructions to cause the processor to:
detect a change in performance in a local data flow; and
transmit data on the local data flow to each of the other end-host devices within the local network.

13. A local network according to claim 12, wherein the executable instructions to cause the processor to detect a change in performance in a local data flow comprise executable instructions to cause the processor to:
monitor a long term average performance of a local data flow;
monitor a current performance of the local data flow; and
detect a change in performance in the local data flow when a difference between the current performance and the long term average performance exceeds a threshold.

14. A local network according to claim 10, wherein the executable instructions to cause the processor to control at least one of the local data flows based on the transmitted and received data comprise executable instructions to cause the processor to:
- identify data flows within the local network which are competing for access to a shared resource in the local network;
- estimate a capacity of the shared resource based on the data received from each of the other end-host devices; and
- allocate a portion of the capacity to at least one of the identified local data flows.

15. A local network according to claim 14, wherein the executable instructions to cause the processor to control at least one of the local data flows based on the transmitted and received data further comprise executable instructions to cause the processor to enforce a capacity allocation on at least one of the local data flows.

16. A network management method comprising:
- collecting data on local connections at each of a plurality of end-hosts;
- collecting, if the change point at the respective end-host device is triggered, the network activity of the respective end-host for a predetermined amount of time to determine a duration of the change point;
- sharing the data on the local connections between each of the plurality of end-hosts;
- correlating the data separately on each end-host device to determine which end-host devices are competing for a shared resource; and
- performing, if the plurality of end-hosts are determined to be competing with each other, independent network control of the local connections at each of the plurality of end-hosts wherein performing independent network control of the local connections at each of the plurality of end-hosts comprises, at each of the plurality of end-hosts:
- identifying competing connections for the shared resource among respective end-host devices;
- allocating capacity between said competing connections; and
- enforcing the capacity allocation on local connections.

* * * * *